United States Patent
Wermelinger et al.

(10) Patent No.: US 11,624,729 B2
(45) Date of Patent: Apr. 11, 2023

(54) METHOD FOR INSPECTING A WELD

(71) Applicant: Georg Fischer Rohrleitungssysteme AG, Schaffhausen (CH)

(72) Inventors: Joerg Wermelinger, Schaffhausen (CH); Riccardo Barbone, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 240 days.

(21) Appl. No.: 17/074,066

(22) Filed: Oct. 19, 2020

(65) Prior Publication Data
US 2021/0132003 A1    May 6, 2021

(30) Foreign Application Priority Data
Oct. 30, 2019  (EP) .................................... 19206226

(51) Int. Cl.
*G06N 20/00*  (2019.01)
*G06Q 10/06*  (2012.01)
(Continued)

(52) U.S. Cl.
CPC ............. *G01N 29/04* (2013.01); *G06N 20/00* (2019.01); *G06Q 10/06395* (2013.01);
(Continued)

(58) Field of Classification Search
CPC .. G01N 29/04; G01N 29/043; G01N 29/4445; G01N 29/069; G01N 2291/023;
(Continued)

(56) References Cited

U.S. PATENT DOCUMENTS 5,533,146 A * 7/1996 Iwai ..................... B23K 9/0956
                                                          348/90
9,471,819 B2 * 10/2016 Tucker ............... G06K 7/10366
(Continued)

FOREIGN PATENT DOCUMENTS

CN         101393170 B     9/2010
WO    WO-2017063355 A1    4/2017

OTHER PUBLICATIONS

U.S. Appl. No. 17/063,201, filed Oct. 5, 2020, Wermelinger, Joerg; Barbone, Riccardo and Kaftan, Paul.
(Continued)

*Primary Examiner* — Jacques M Saint Surin
(74) *Attorney, Agent, or Firm* — Harness, Dickey & Pierce, P.L.C.

(57) ABSTRACT

A method for inspecting a weld of plastic pipes by means of a data processing device, comprising:
 capturing and storing documents;
 monitoring and recording the installation and the implementation of the weld of the joint;
 producing a welding report, or adopting a welding report from the welding machine;
 testing the weld ultrasonically, wherein the test detects and stores the defects that are in the weld;
 wherein software is used to capture and store the documents, the welding report and the defects, more specifically the data on said defects, wherein an algorithm of the software is used to evaluate the stored documents, reports, defects and data on said defects, and to classify the welded joint as compliant or non-compliant with the requirements.

7 Claims, 1 Drawing Sheet

(51) Int. Cl.
*G06Q 10/10* (2012.01)
*G06Q 30/00* (2012.01)
*G01N 29/04* (2006.01)
*G06Q 10/0639* (2023.01)
*G06Q 30/018* (2023.01)

(52) U.S. Cl.
CPC ......... *G06Q 10/10* (2013.01); *G06Q 30/0185* (2013.01); *G01N 2291/0235* (2013.01); *G01N 2291/0289* (2013.01); *G01N 2291/267* (2013.01)

(58) Field of Classification Search
CPC ... G01N 2291/0235; G01N 2291/0289; G01N 2291/267; G06N 20/00; G06Q 10/06395; G06Q 10/10; G06Q 30/0185; B29C 65/34; B29C 66/1142; B29C 66/522; B29C 66/5229; B29C 66/9672; B29C 66/9674; B29C 65/8292; B29C 65/82; B29C 65/02; B29C 65/30; B29C 66/11; B29C 66/14; B29C 66/97; G06T 7/0004; B29D 23/00
USPC .......................................................... 73/588
See application file for complete search history.

(56) References Cited

U.S. PATENT DOCUMENTS

| | | | |
|---|---|---|---|
| 2016/0071059 A1* | 3/2016 | Petering | G06Q 10/103 705/301 |
| 2016/0139082 A1* | 5/2016 | Ross | B29C 66/1222 73/588 |
| 2018/0292357 A1 | 10/2018 | Leach et al. | |

OTHER PUBLICATIONS

U.S. Appl. No. 17/069,053, filed Oct. 13, 2020, Barbone, Riccardo & Wermelinger, Joerg.

* cited by examiner

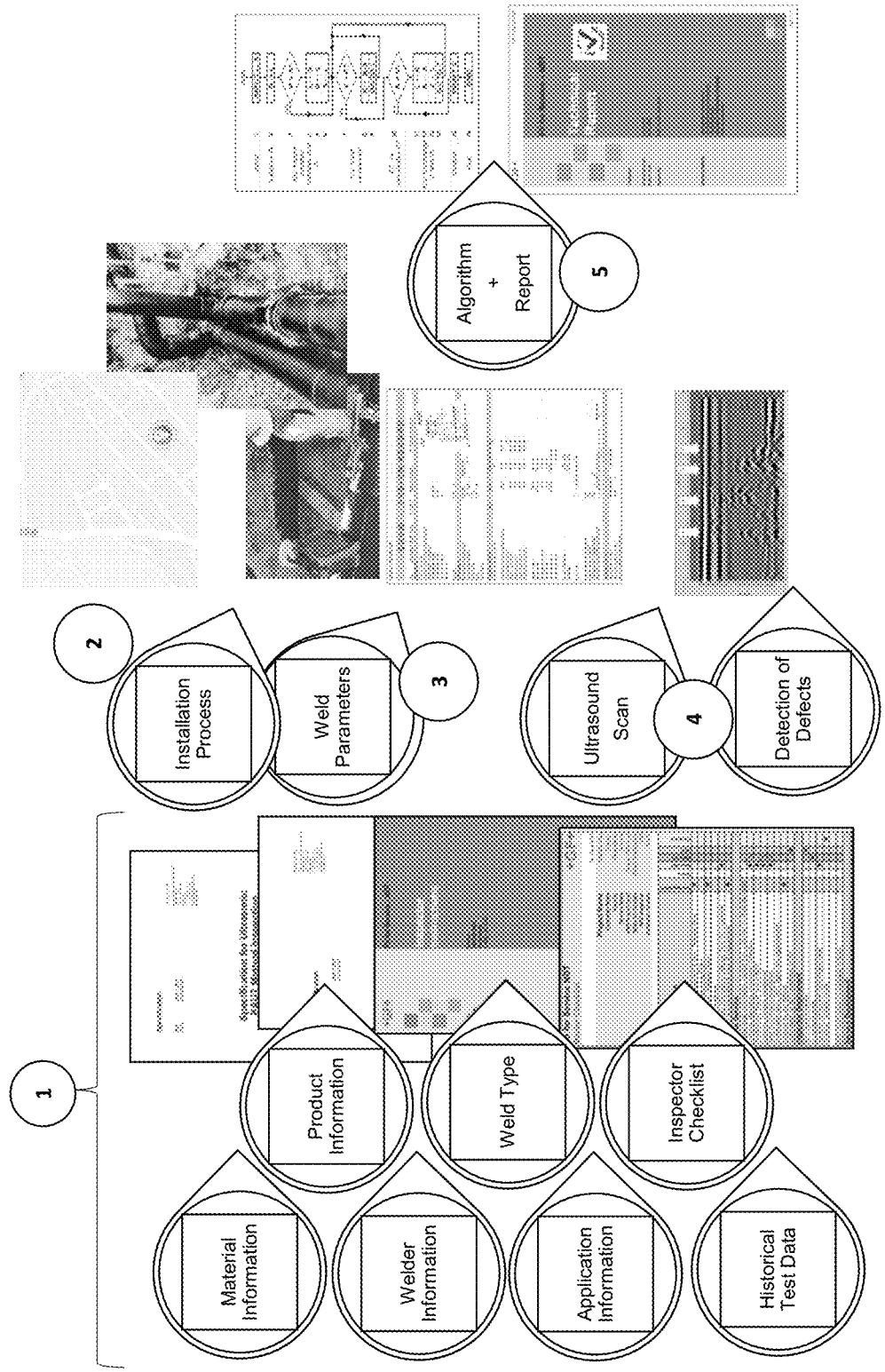

METHOD FOR INSPECTING A WELD

CROSS-REFERENCE TO RELATED APPLICATIONS

This application claims the benefit and priority of European Patent Application No. 19 206 2263 filed Oct. 30, 2019. The entire disclosure of the above application is incorporated herein by reference.

BACKGROUND OF THE INVENTION

The invention relates to a method for inspecting a weld of plastic pipes by means of a data processing device, comprising:
capturing and storing documents;
monitoring and recording the installation and the implementation of the weld of the joint;
producing a welding report;
testing the weld ultrasonically, wherein the test detects and stores the defects that are in the weld.

1. Field of the Invention

The individual steps such as producing relevant documents, performing a weld and producing a welding report, as well as testing the welded joint, are known from the prior art. The documentation and data are managed separately, however, and do not allow an automatic, generated appraisal of the welded joint.

2. Discussion

This has the disadvantage that often the welded joint is approved despite not all the documentation being available, and also that not all the data is incorporated in the evaluation of the welded joint.

SUMMARY OF THE INVENTION

One aspect of the invention is to propose a method that allows an assessment of an ultrasonically tested welded-joint that is implemented in-situ on a plastic pipe, which assessment is automatically generated from captured documents and data.

This aspect is achieved according to the invention in that software is used to capture and store the documents, the welding report and the defects, more specifically the data on said defects, wherein an algorithm of the software is used to evaluate the stored documents, reports, defects and data, and to classify the welded joint as compliant or non-compliant with the requirements. All the recorded documents and data provide conclusions about the welded-joint quality, which then can be evaluated by an algorithm to assess whether or not the welded joint satisfies the requirements.

The method according to the invention for inspecting a welded joint between plastic pipes or fittings and pipes as well as welds using electrofusion couplers is performed and correspondingly evaluated by means of a data processing device.

A smartphone, a tablet or else a portable computer, as well as other known data processing devices, can preferably be used as the data processing device.

The inspection method includes, inter alia, the capture and storage of documents, preferably material specifications, records, agreements, certificates, reports, technical specifications, etc., any documents relating to the components and the welding of the components for the purpose of verifying the quality and acceptability thereof. Obviously it is possible to define accordingly which documents etc. are required in order to be able to perform an evaluation, and which can be optionally saved.

The installation and the implementation of the weld between the fitting and pipe or two pipes is monitored and suitably recorded by means of a data processing device, preferably captured and recorded by images and/or videos as well as the welding data from the welding device.

A welding report is then produced from the captured welding data, wherein said welding report is produced preferably autonomously by the software, or the welding report has already been produced by the welding machine, and is now transmitted to the data processing machine.

As an additional step of the method according to the invention, the weld is tested ultrasonically, wherein the test detects and stores the defects that are in the weld.

All the collected documents, the welding report, the data and the defects are saved in software, or stored such that software can access all the collected documents, the welding report, the data and the defects, and an algorithm of the software evaluates the stored documents, reports, defects and data, and classifies the welded joint as compliant or non-compliant with the requirements.

The method according to the invention can preferably be applied to butt-fusion welds and electrofusion-coupler welds. Plastic pipes can accordingly be butt-fusion welded to each other and also joined by means of an electrofusion coupler. Obviously other fittings can also be butt-fusion welded to the pipe ends.

It is advantageous if the installation is specified step by step, and is monitored and recorded step by step. For example, the software defines how the coupler is meant to be pushed onto the pipe, for instance by means of pictures or drawings, and this is verified by means of photos that are saved by the software. Preferably, also the position of the weld is captured by corresponding coordinates, whereby it is always possible to trace precisely the location of the weld even if it lies underground, as is typical in most cases of laid pipelines.

The algorithm preferably includes adopting an initial value based on the components to be welded. This means that, for example, if an electrofusion coupler of a certain diameter and material is used, a predefined numerical value is adopted by the software as the initial value. In addition, values are calculated for the defects detected and stored by the ultrasonic testing. Then the values calculated on the basis of the defects are subtracted from the adopted initial value to obtain a difference value for the tested weld. This difference value is compared with a reference value, which likewise is predefined for the relevant weld. The reference value is an empirical value based on prior destructive long-term tests, which determine what minimum value must exist for compliance with the requirements. If the difference value equals, or lies above, the reference value, the weld is admissible; if the difference value lies below, the weld is inadmissible.

It is advantageous if the defects are calculated on the basis of their dimension. This means that preferably the width, length and/or depth of the defects is detected and suitably calculated, and as a corresponding value is incorporated in the algorithm and deducted from the adopted initial value.

It has proved advantageous for the software to be in the form of an app. Constraints are thereby placed on, and specified for the user, which the user must satisfy. For instance, it is then specified that mandatory documents, reports etc. are meant to be entered into the app, otherwise the welded joint is not approved, or an assessment by the software is not possible. This is the case even if, for instance, after the test, no defects were detectable in the weld and the weld is actually assessed to be good, but certain documents for clearance are missing. Such a setting for the app, however, can also be changed and be less restrictive.

The data is preferably collected and stored centrally, for instance in a Cloud or a remote server, and accessed by the software. It is also possible for the data to be accessed via a Web platform. Hence the data can be accessed not only via a Web platform but also via an app or other software.

The algorithm is preferably refined by receiving new data, or the system is self-learning.

BRIEF DESCRIPTION OF THE DRAWINGS

An exemplary embodiment of the invention is described with reference to the FIGURES, in which the invention is not limited solely to the exemplary embodiment; in which:

FIG. 1 shows a schematic view of the method according to the invention and the documents and steps contained therein.

DESCRIPTION OF THE PREFERRED EMBODIMENTS

The drawing presented in FIG. 1 shows all the data and documentation that the method according to the invention needs to assess whether a welded joint is admissible. FIG. 1 shows a few preferred documents 1 that the software and data processing device capture for the method. It is obviously possible to define precisely in the software which documents are mandatory for the assessment and which are optional. These documents are then captured and stored. The storage can take place in the data processing device and also on an external server or in a Cloud. The installation process 2 of the pipes and/or fittings is then monitored by an image, for instance, and the position or coordinates of the weld are recorded. This is also again entered and managed by means of the software. In addition, the data from the ultrasonic welding is captured 3, wherein the welding device transmits the data to the software of the method according to the invention or to the data processing device, and a welding report 3 is produced using the software, or the welding report 3 is already produced by the welding machine and is transmitted to the software. The weld is then tested ultrasonically 4, wherein the test provides information about defects in the weld. An algorithm 5 (flow diagram is a purely notional representation) saved in the software and the captured data and documents are used to produce a report 5, which indicates whether the weld is admissible or inadmissible, preferably on the basis of the welded-joint quality.

What is claimed is:

1. A method for inspecting a weld of plastic pipes by means of a data processing device, comprising:
    capturing and storing data in documents;
    welding the joint;
    monitoring and recording information about the installation and the implementation of the weld of the joint;
    producing a welding report, or adopting a welding report from a welding machine;
    thereafter, testing the weld ultrasonically, wherein the test detects and stores defects that are in the weld;
    capturing and storing, in a non-volatile memory, the welding report and information about the defects in the weld;
    evaluating, in a processor, the stored documents, welding report and information about the defects in the weld; and
    classifying the weld as compliant or non-compliant based on the evaluation.

2. A method according to claim 1, wherein the method is applied to butt-fusion welds or electrofusion-coupler welds.

3. A method according to claim 1, wherein the installation is specified step by step, and is monitored and recorded step by step.

4. A method according to claim 1, wherein the algorithm includes the following steps:
    adopting an initial value based on the components to be welded;
    calculating a value based on the detected and stored defects;
    subtracting the calculated value for the defects from the initial value;
    checking whether the difference value obtained lies above or below a defined threshold value, on the basis of which the weld is deemed to be admissible or inadmissible.

5. A method according to claim 1, wherein the defects are calculated on the basis of their dimension.

6. A method according to claim 1, wherein the width, length and/or depth of the defects is detected and evaluated for the purpose of calculating the defects.

7. A method according to claim 1, wherein the software is formed by an app.

* * * * *